United States Patent
Suzuki et al.

(10) Patent No.: US 9,663,211 B2
(45) Date of Patent: May 30, 2017

(54) BOAT MANEUVERING SYSTEM

(71) Applicant: YAMAHA HATSUDOKI KABUSHIKI KAISHA, Shizuoka-ken (JP)

(72) Inventors: Takayoshi Suzuki, Shizuoka-Ken (JP);
Noriyoshi Hiraoka, Shizuoka-Ken (JP);
Akihiro Onoue, Shizuoka-Ken (JP);
Atsushi Kumita, Shizuoka-Ken (JP);
Yoshiaki Tasaka, Shizuoka-Ken (JP)

(73) Assignee: YAMAHA HATSUDOKI KABUSHIKI KAISHA, Shizuoka-Ken (JP)

( * ) Notice: Subject to any disclaimer, the term of this patent is extended or adjusted under 35 U.S.C. 154(b) by 0 days.

(21) Appl. No.: 14/839,140

(22) Filed: Aug. 28, 2015

(65) Prior Publication Data

US 2016/0096610 A1    Apr. 7, 2016

(30) Foreign Application Priority Data

Oct. 2, 2014   (JP) ................................ 2014-204190

(51) Int. Cl.
*B63H 25/02*       (2006.01)
*B63H 25/42*       (2006.01)
*G05D 1/02*        (2006.01)

(52) U.S. Cl.
CPC ........... *B63H 25/42* (2013.01); *G05D 1/0206* (2013.01); *B63H 2025/026* (2013.01)

(58) Field of Classification Search
CPC . B63H 2025/026; B63H 25/42; G05D 1/0206
USPC .......................................................... 701/21
See application file for complete search history.

(56) References Cited

U.S. PATENT DOCUMENTS

| | | | | |
|---|---|---|---|---|
| 7,267,068 | B2 * | 9/2007 | Bradley ................. | B63H 25/42 114/144 A |
| 7,702,431 | B2 * | 4/2010 | Kaji ...................... | B63B 39/061 440/1 |
| 8,033,878 | B2 * | 10/2011 | Shibayama .......... | B63H 21/213 440/1 |
| 8,190,316 | B2 * | 5/2012 | Kaji ...................... | B63H 21/213 318/588 |
| 8,924,054 | B1 * | 12/2014 | Arbuckle ............... | B63H 21/21 701/21 |
| 9,039,468 | B1 * | 5/2015 | Arbuckle ............. | B63H 21/213 440/1 |
| 9,248,898 | B1 * | 2/2016 | Kirchhoff ............ | B63H 21/213 |
| 2003/0060094 | A1 * | 3/2003 | Motsenbocker ......... | B63H 1/28 440/6 |

(Continued)

FOREIGN PATENT DOCUMENTS

| | | |
|---|---|---|
| JP | 2013-095245 A | 5/2013 |
| JP | 2013-103525 A | 5/2013 |

(Continued)

*Primary Examiner* — Atul Trivedi
(74) *Attorney, Agent, or Firm* — Rabin & Berdo, P.C.

(57) ABSTRACT

A boat maneuvering system includes a power source, a first controller that controls the power source, a display device that has a touch panel function and displays an operation screen configured to operate the movement of a boat, and a second controller that is communicatively connected to the first controller and enables an operation of the boat through the operation screen when detecting a plurality of operations on the display device simultaneously.

20 Claims, 9 Drawing Sheets

(56) References Cited

U.S. PATENT DOCUMENTS

| | | | | |
|---|---|---|---|---|
| 2004/0090195 A1* | 5/2004 | Motsenbocker | B63B 43/18 | 318/109 |
| 2005/0268834 A1* | 12/2005 | Koda | A63H 23/04 | 114/144 RE |
| 2006/0058929 A1* | 3/2006 | Fossen | B63B 9/001 | 701/21 |
| 2006/0116796 A1* | 6/2006 | Fossen | G05D 1/0875 | 701/21 |
| 2007/0078575 A1* | 4/2007 | Wilson | B63J 99/00 | 701/21 |
| 2007/0089660 A1* | 4/2007 | Bradley | B63H 25/42 | 114/144 A |
| 2007/0155258 A1* | 7/2007 | Kaji | B63H 21/213 | 440/87 |
| 2007/0157864 A1* | 7/2007 | Aldin | B63B 1/107 | 114/281 |
| 2007/0168109 A1* | 7/2007 | Kaji | F02D 11/105 | 701/114 |
| 2007/0293103 A1* | 12/2007 | Kinoshita | B63B 35/731 | 440/1 |
| 2008/0027597 A1* | 1/2008 | Barrett | B63H 25/04 | 701/21 |
| 2008/0233812 A1* | 9/2008 | Kawanishi | B63H 21/213 | 440/1 |
| 2009/0117788 A1* | 5/2009 | Kaji | B63H 25/04 | 440/1 |
| 2009/0298359 A1* | 12/2009 | Hiroshima | B63H 21/22 | 440/1 |
| 2010/0023192 A1* | 1/2010 | Rae | B63H 11/107 | 701/21 |
| 2010/0138083 A1* | 6/2010 | Kaji | B63H 25/02 | 701/21 |
| 2011/0153125 A1* | 6/2011 | Arbuckle | B63B 39/00 | 701/21 |
| 2011/0166724 A1* | 7/2011 | Hiramatsu | B63H 21/213 | 701/21 |
| 2011/0172858 A1* | 7/2011 | Gustin | B63H 21/213 | 701/21 |
| 2013/0110329 A1* | 5/2013 | Kinoshita | B63H 25/02 | 701/21 |
| 2014/0046515 A1* | 2/2014 | Mizutani | B63H 21/21 | 701/21 |
| 2015/0261222 A1* | 9/2015 | Morikami | B63H 25/42 | 701/21 |
| 2016/0018516 A1* | 1/2016 | Brown | G01S 7/526 | 367/11 |
| 2016/0259520 A1* | 9/2016 | Gatland | G01S 15/025 | |

FOREIGN PATENT DOCUMENTS

| | | |
|---|---|---|
| JP | 2013-103526 A | 5/2013 |
| JP | 2013-106082 A | 5/2013 |

\* cited by examiner

FIG.3 TOUCH OPERATION (MODE 1)
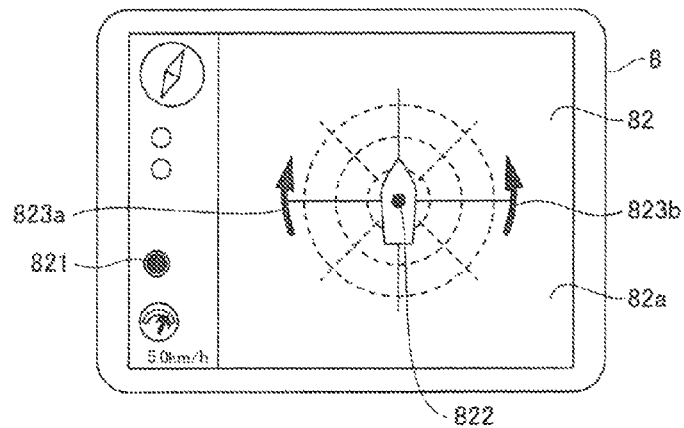
FIG.4
PARALLEL MOVEMENT OPERATION (MODE 1)
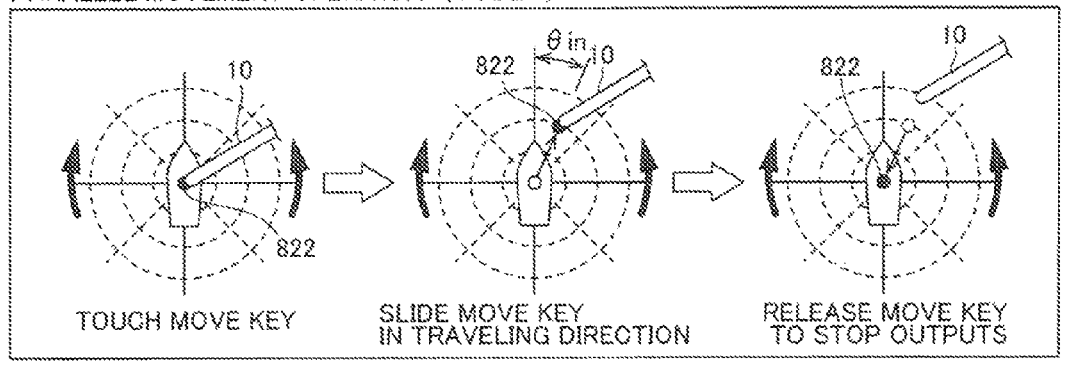
FIG.5
ROTATIONAL MOVEMENT OPERATION (MODE 1)
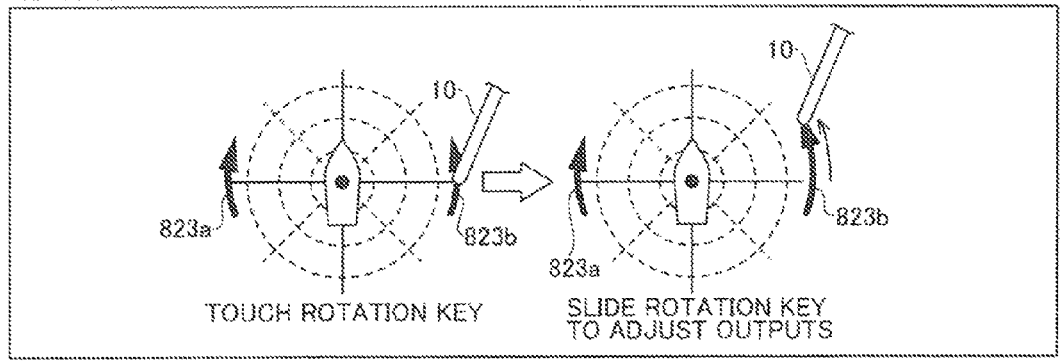

FIG.6  GYRO OPERATION (MODE 2)
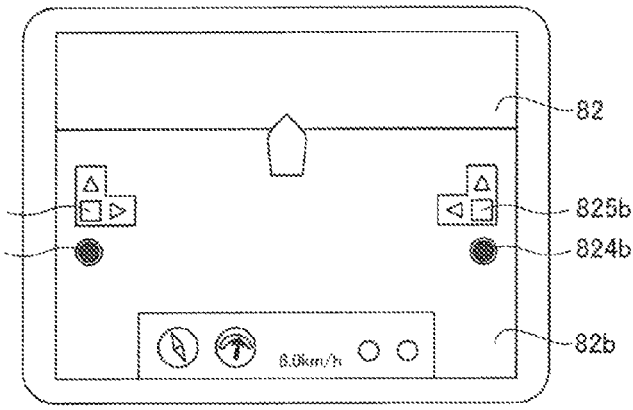
FIG.7
FRONT-BACK MOVEMENT AND TURNING OPERATIONS (MODE 2)
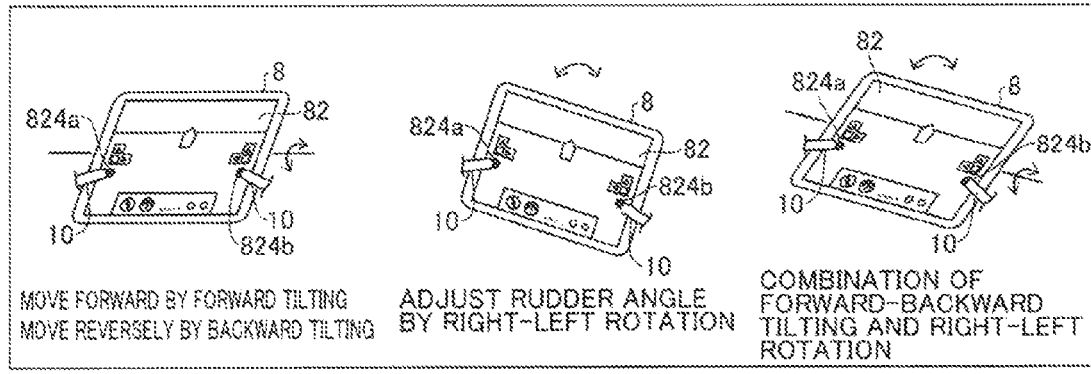
FIG.8
RIGHT-LEFT MOVEMENT OPERATION (MODE 2)
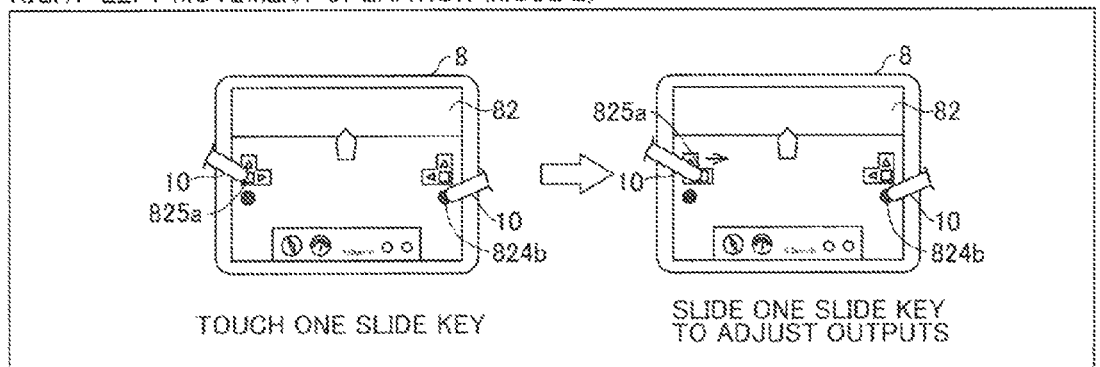

ROTATIONAL MOVEMENT OPERATION (MODE 2)

TOUCH ONE SLIDE KEY → SLIDE ONE SLIDE KEY TO ADJUST OUTPUTS

ROLL

PITCH

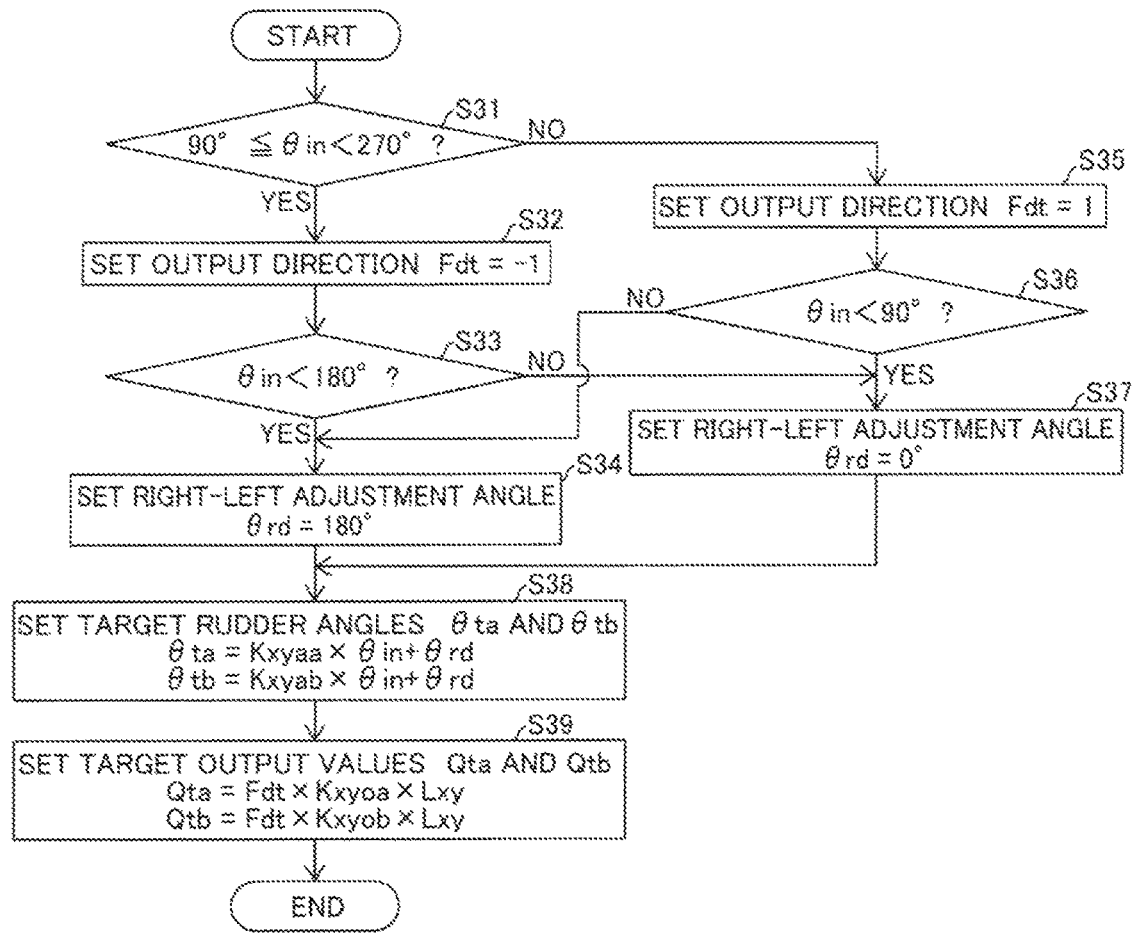

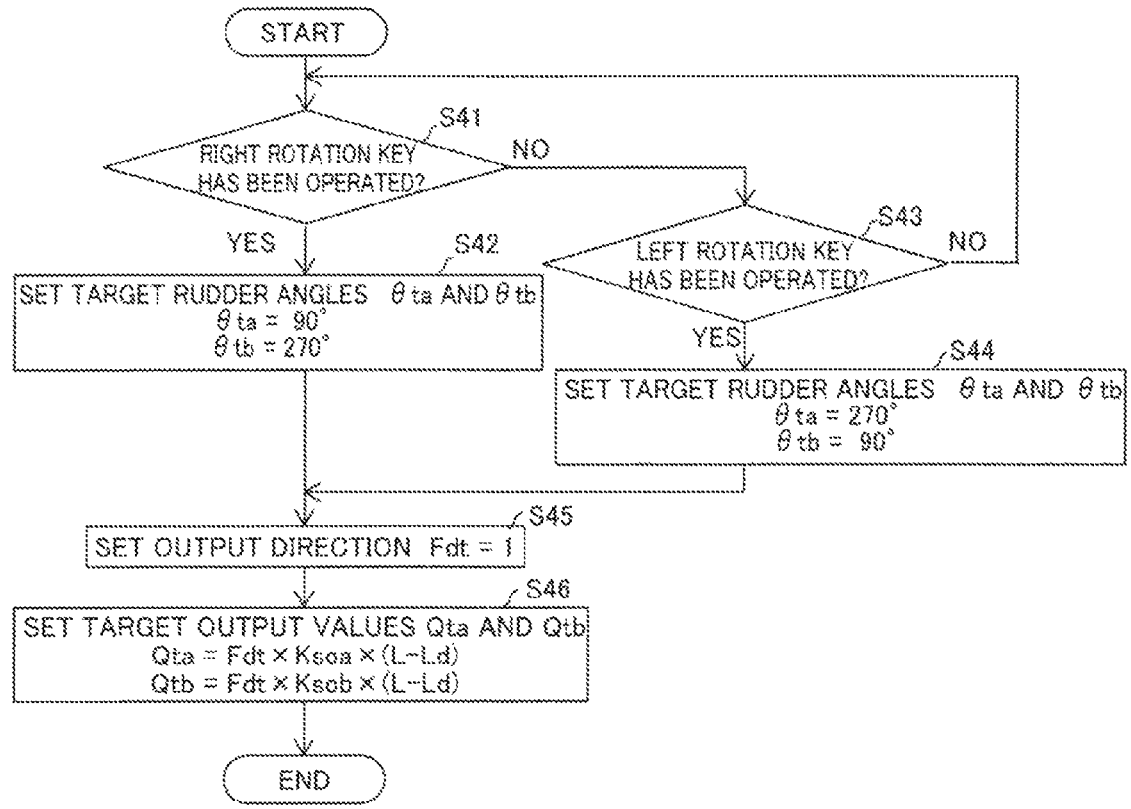

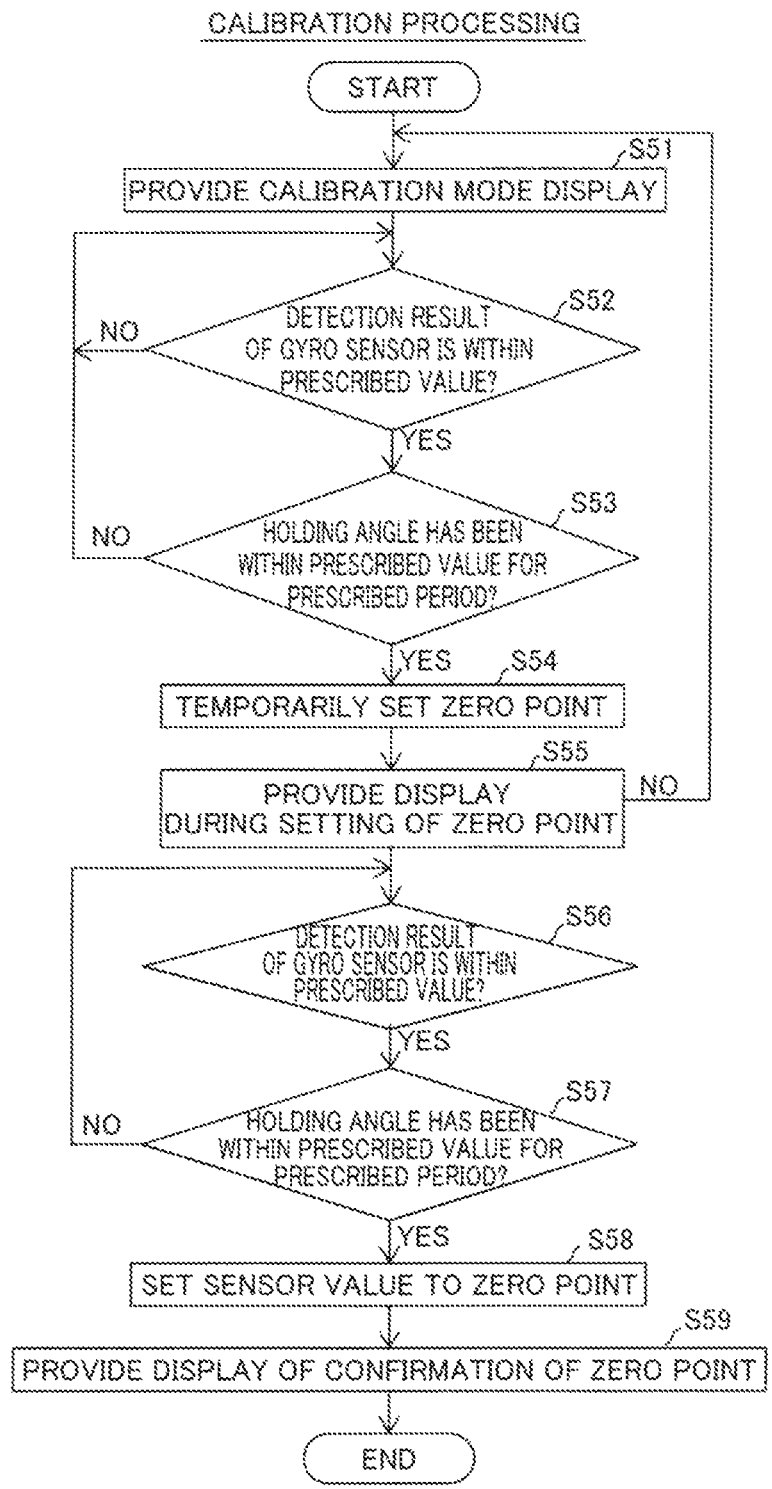

BOAT MANEUVERING SYSTEM

CROSS-REFERENCE TO RELATED APPLICATION

The priority application number JP2014-204190, Boat Maneuvering System, Oct. 2, 2014, Takayoshi Suzuki, Noriyoshi Hiraoka, Akihiro Onoue, Atsushi Kumita, and Yoshiaki Tasaka, upon which this patent application is based is hereby incorporated by reference.

BACKGROUND OF THE INVENTION

Field of the Invention

The present invention relates to a boat maneuvering system.

Description of the Background Art

A boat maneuvering system is known in general. Such a boat maneuvering system is disclosed in Japanese Patent Laying-Open No. 2013-103526, for example.

The aforementioned Japanese Patent Laying-Open No. 2013-103526 discloses a boat maneuvering system including a marine propulsion device, an engine ECU that controls the marine propulsion device, and a display device that has a touch panel function and displays an operation screen configured to operate the movement of a boat. In this boat maneuvering system according to Japanese Patent Laying-Open No. 2013-103526, a user operates software keys displayed on the operation screen of the display device to maneuver the boat.

In the boat maneuvering system according to the aforementioned Japanese Patent Laying-Open No. 2013-103526, the user can maneuver the boat by operating the software keys displayed on the operation screen of the display device, but a boat maneuvering system capable of more accurately detecting an operation intended by the user is preferable.

SUMMARY OF THE INVENTION

The present invention has been proposed in order to solve the aforementioned problem, and an object of the present invention is to provide a boat maneuvering system capable of more accurately detecting an operation intended by a user.

A boat maneuvering system according to an aspect of the present invention includes a power source, a first controller that controls the power source, a display device that has a touch panel function and displays an operation screen configured to operate the movement of a boat, and a second controller that is communicatively connected to the first controller and enables an operation of the boat through the operation screen when detecting a plurality of operations on the display device simultaneously.

As hereinabove described, the boat maneuvering system according to this aspect is provided with the second controller that enables the operation of the boat through the operation screen when detecting the plurality of operations on the display device simultaneously, whereby the second controller accepts no operation when a user touches the display device at one point but accepts operations through the display device only when the user intends to perform the plurality of operations simultaneously. Thus, the boat maneuvering system that operates the movement of the boat through the operation screen of the display device can more accurately detect an operation intended by the user.

In the aforementioned boat maneuvering system according to this aspect, the second controller is preferably configured to enable the operation of the boat through the operation screen when detecting a plurality of operations including a touch panel operation on the display device simultaneously. According to this structure, the second controller can easily accept an operation of the user by accepting the plurality of operations including the touch panel operation simultaneously.

In the aforementioned boat maneuvering system according to this aspect, the display device and the second controller are preferably unitized. According to this structure, the structure can be simplified by unitization, as compared with the case where the display device and the second controller are provided separately.

In the aforementioned boat maneuvering system according to this aspect, the thrust of the power source preferably can be manipulated through the operation screen. According to this structure, the user can easily manipulate the thrust of the power source through the display device while the display device accurately detects the operation of the user.

In the aforementioned boat maneuvering system according to this aspect, turning of the power source preferably can be operated through the operation screen. According to this structure, the user can easily operate turning of the power source through the display device while the display device accurately detects the operation of the user.

In the aforementioned boat maneuvering system according to this aspect, a plurality of power sources are preferably provided, and the plurality of power sources are preferably controlled on the basis of an operation through the operation screen. According to this structure, by combining the propulsion power of the plurality of power sources, the boat can be easily moved in an arbitrary direction and can be easily rotationally moved.

In this case, the plurality of power sources preferably can be operated individually on the basis of the operation through the operation screen. According to this structure, the user can operate the plurality of power sources individually and more easily maneuver the boat by performing an operation on the display device.

In the aforementioned boat maneuvering system according to this aspect, the operation of the power source is preferably stopped when a plurality of inputs are not detected during the operation of the boat through the display device. According to this structure, the boat maneuvering system can stop the operation of the power source not to allow boat maneuvering when the boat maneuvering system does not detect a plurality of inputs and cannot confirm the intent of the operation of the user.

In this case, the operation of the power source is preferably stopped to reduce the thrust of the boat to almost zero. According to this structure, the boat maneuvering system can promptly stop the movement of the boat when the boat maneuvering system does not detect a plurality of inputs and cannot confirm the intent of the operation of the user.

In the aforementioned structure in which the operation of the power source is stopped, the operation of the power source is preferably stopped to maintain the turning angle of the power source. According to this structure, the boat maneuvering system can restart boat maneuvering from the stop state when the user provides a plurality of inputs again.

In the aforementioned boat maneuvering system according to this aspect, a software key configured to maneuver the boat is preferably displayed on the operation screen. According to this structure, the user can easily maneuver the boat by the software key.

In this case, the software key displayed on the operation screen preferably includes a first key configured to enable an operation and a second key configured to instruct the boat to move, and the second controller is preferably configured to enable a movement operation of the boat through the operation screen when detecting operations on the first key and the second key simultaneously. According to this structure, the intent of the operation of the user can be easily confirmed by the first key and the second key.

In the aforementioned boat maneuvering system according to this aspect, the display device preferably includes at least one of an angular velocity sensor and an acceleration sensor and is preferably configured to detect the tilted posture of the display device and accept an operation for maneuvering the boat on the basis of a detection result of at least one of the angular velocity sensor and the acceleration sensor. According to this structure, the user can easily maneuver the boat by tilting and operating the display device.

In this case, the reference position of the tilted posture of the display device is preferably calibrated on the basis of the detection result of at least one of the angular velocity sensor and the acceleration sensor when a user maneuvers the boat through the display device. According to this structure, the boat maneuvering system can accurately detect the operation of tilting the display device by calibration.

The foregoing and other objects, features, aspects, and advantages of the present invention will become more apparent from the following detailed description of the present invention when taken in conjunction with the accompanying drawings.

BRIEF DESCRIPTION OF THE DRAWINGS

FIG. 3 is a diagram for illustrating the touch operation (mode 1) of the boat maneuvering system according to the embodiment of the present invention;

FIG. 4 is a diagram for illustrating a parallel movement operation of the touch operation (mode 1) of the boat maneuvering system according to the embodiment of the present invention;

FIG. 5 is a diagram for illustrating a rotational movement operation of the touch operation (mode 1) of the boat maneuvering system according to the embodiment of the present invention;

FIG. 6 is a diagram for illustrating the gyro operation (mode 2) of the boat maneuvering system according to the embodiment of the present invention;

FIG. 7 is a diagram for illustrating a front-back movement operation and a turning operation of the gyro operation (mode 2) of the boat maneuvering system according to the embodiment of the present invention;

FIG. 8 is a diagram for illustrating a right-left movement operation of the gyro operation (mode 2) of the boat maneuvering system according to the embodiment of the present invention;

FIG. 14 is a flowchart for illustrating processing for setting the target rudder angles and the target output values of thrusters to be moved in parallel in the boat maneuvering system according to the embodiment of the present invention;

FIG. 15 is a flowchart for illustrating processing for setting the target rudder angles and the target output values of the thrusters to be rotationally moved in the boat maneuvering system according to the embodiment of the present invention; and FIG. 16 is a flowchart for illustrating calibration processing for boat maneuvering processing in the mode 2 in the boat maneuvering system according to the embodiment of the present invention.

DESCRIPTION OF THE PREFERRED EMBODIMENT

An embodiment of the present invention is hereinafter described with reference to the drawings.

The structure of a boat maneuvering system 100 according to the embodiment of the present invention is now described with reference to FIGS. 1 and 2. In the figure, arrow FWD represents the forward movement direction of a boat 1, and arrow BWD represents the reverse movement direction of the boat 1. Furthermore, in the figure, arrow R represents the starboard direction of the boat 1, and arrow L represents the portside direction of the boat 1.

Figure 1:
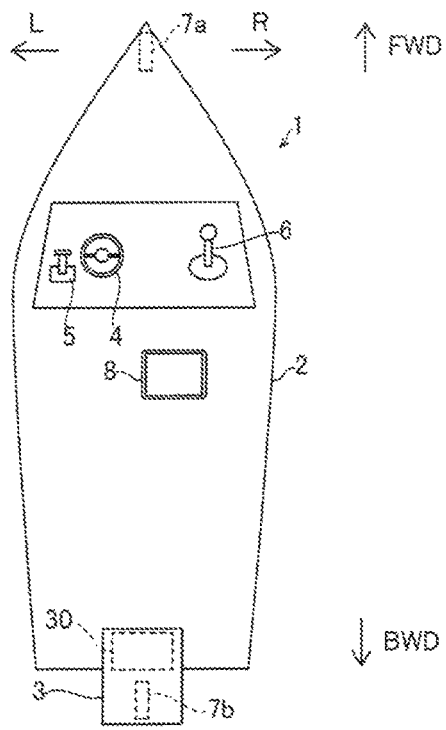
FIG. 1 is a diagram showing a boat including a boat maneuvering system according to an embodiment of the present invention.

The boat maneuvering system 100 (see FIG. 2) is provided to maneuver the boat 1 shown in FIG. 1. The boat 1 includes a boat body 2, an outboard motor 3 mounted on a rear portion of the boat body 2, configured to propel the boat body 2, a steering wheel 4 configured to steer the boat body 2 (turn the outboard motor 3), a remote controller 5 configured to operate the shift and output (throttle position) of the outboard motor 3, a joystick 6 configured to operate the movement of the boat body 2, thrusters 7a and 7b configured to propel the boat body 2, and a touch-screen display device 8 configured to operate the movement of the boat body 2 (operate the thrusters 7a and 7b), as shown in FIG. 1. The outboard motor 3 and the thrusters 7a and 7b are examples of the "power source" in the present invention.

One outboard motor 3 is mounted on the rear portion of the boat body 2. The outboard motor 3 includes an engine 30. The outboard motor 3 is arranged to extend to below the engine 30 and includes a drive shaft that transmits the drive force of the engine 30, one propeller shaft that extends in a direction orthogonal to (intersecting with) the drive shaft, and one propeller mounted on a rear end portion of the propeller shaft, rotated together with the propeller shaft.

Figure 2:
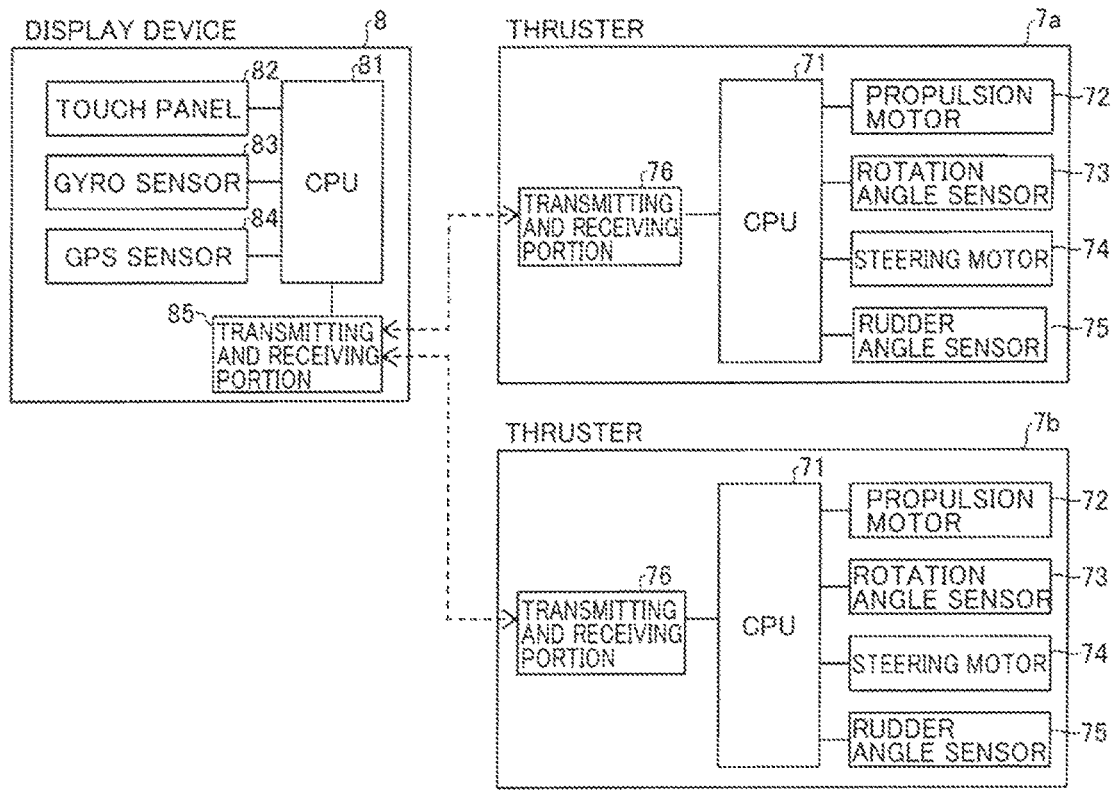
FIG. 2 is a block diagram schematically showing the boat maneuvering system according to the embodiment of the present invention.

The thrusters 7a and 7b each include a CPU (central processing unit) 71, a propulsion motor 72, a rotation angle sensor 73, a steering motor 74, a rudder angle sensor 75, and a transmitting and receiving portion 76 as the control structure, as shown in FIG. 2. The CPU 71 is an example of the "first controller" in the present invention.

The display device 8 includes a CPU 81, a touch panel 82, a gyro sensor 83, a GPS (global positioning system) sensor 84, and a transmitting and receiving portion 85 as the control structure, as shown in FIG. 2. The CPU 81 is an example of the "second controller" in the present invention, and the gyro sensor 83 is an example of the "angular velocity sensor" in the present invention.

The thrusters 7a and 7b are provided on the front and rear portions (a bow and a stern) of the boat body 2, respectively, as shown in FIG. 1. The thrusters 7a and 7b are rotatable along a rotation axis that vertically extends. In other words, the thrusters 7a and 7b allow thrust to act in an arbitrary direction in a planar direction. The thrusters 7a and 7b are connected to a battery (not shown) and are driven by electric power. The thrusters 7a and 7b allow thrust to act in two directions (a 0 degree direction and a 180 degree direction, for example) at the same turning angle according to the rotation directions of the propulsion motors 72. In other words, the thrusters 7a and 7b normally rotate the propulsion motors 72 to generate thrust in one direction. The thrusters 7a and 7b reversely rotate the propulsion motors 72 to generate thrust in another direction opposite to one direction (a 180 degree direction with respect to one direction).

The CPU 71 of the thruster 7a (7b) controls each portion of the thruster 7a (7b). Specifically, the CPU 71 receives an operation signal from the display device 8 or the joystick 6 and controls the operation of the thruster 7a (7b). More specifically, the CPU 71 controls the driving of the propulsion motor 72 on the basis of the operation signal. The CPU 71 acquires the rotation position of the propulsion motor 72 on the basis of a detection result of the rotation angle sensor 73. The CPU 71 drives the steering motor 74 on the basis of the operation signal and adjusts a direction in which the thrust of the thruster 7a (7b) is generated. The CPU 71 acquires the rotation angle (the direction in which the thrust is generated) of the thruster 7a (7b) in a horizontal plane on the basis of a detection result of the rudder angle sensor 75.

The CPU 71 transmits and receives a control signal to and from the CPU 81 of the display device 8 through the transmitting and receiving portion 76. The transmitting and receiving portion 76 transmits and receives the control signal according to the wireless communication standards of a wireless LAN (local area network), Bluetooth (registered trademark), or the like.

The display device 8 controls the thrusters 7a and 7b to operate the movement of the boat 1. The display device 8 is portable, and a user can maneuver the boat anywhere in the boat 1, holding the display device 8 in his/her hand. The display device 8 may be a mobile electronic computing device. The mobile computing device may be a laptop, smartwatch, mobile telephone or a tablet computer, for example. The display device 8 and the CPU 81 are unitized. In other words, the CPU 81 is embedded in the display device 8.

According to this embodiment, operation screens 82a and 82b (see FIGS. 3 and 6) configured to operate the movement of the boat 1 are displayed on the touch panel 82 of the display device 8. The thrust of the thrusters 7a and 7b can be manipulated through the operation screens 82a and 82b. The thrusters 7a and 7b can be turned through the operation screens 82a and 82b. A plurality of thrusters 7a and 7b are controlled on the basis of operations performed through the operation screens 82a and 82b. In other words, the plurality of thrusters 7a and 7b can be individually operated on the basis of operations performed through the operation screens 82a and 82b.

The CPU 81 of the display device 8 controls each portion of the display device 8. Specifically, the CPU 81 detects an operation of the user on the basis of an operation on the touch panel 82. The CPU 81 displays a screen on the touch panel 82. The CPU 81 acquires the posture of the display device 8 on the basis of a detection result of the gyro sensor 83. The CPU 81 acquires the position of the display device 8 on the basis of a detection result of the GPS sensor 84.

The CPU 81 outputs control signals to the thrusters 7a and 7b through the transmitting and receiving portion 85 on the basis of a boat maneuvering operation of the user on the touch panel 82. The transmitting and receiving portion 85 transmits and receives the control signals according to the wireless communication standards of a wireless LAN (local area network), Bluetooth (registered trademark), or the like. In other words, the transmitting and receiving portion 85 can wirelessly communicate with the transmitting and receiving portions 76 of the thrusters 7a and 7b.

According to this embodiment, the display device 8 can maneuver the boat 1 by a mode 1 in which the boat is maneuvered by a touch operation as shown in FIG. 3 and a mode 2 in which the boat is maneuvered by a gyro operation as shown in FIG. 6. The mode 1 and the mode 2 can be switched by selection of the user.

As shown in FIG. 3, in the mode 1 in which the boat is maneuvered by a touch operation, the operation screen 82a is displayed on the touch panel 82. Specifically, an activation key 821, a move key 822, and rotation keys 823a and 823b are displayed on the operation screen 82a. The CPU 81 enables the operation of the boat 1 performed through the operation screen 82a when detecting a plurality of operations including a touch panel operation on the display device 8 (touch panel 82) simultaneously. In other words, in this mode 1, the move key 822, the rotation key 823a, or the rotation key 823b is touched simultaneously with the activation key 821 in a state where the activation key 821 is touched, whereby the boat 1 can be maneuvered. The activation key 821, the move key 822, and the rotation keys 823a and 823b are examples of the "software key" in the present invention. The activation key 821 is an example of the "first key" in the present invention, and the move key 822 and the rotation keys 823a and 823b are examples of the "second key" in the present invention.

Specifically, the CPU 81 enables the movement operation of the boat 1 performed through the operation screen 82a when detecting operations on the activation key 821 and the move key 822, the rotation key 823a, or the rotation key 823b simultaneously.

More specifically, the user touches the move key 822 by an operation object 10 (such as a finger or a touch pen) while touching the activation key 821 (see FIG. 3) by another operation object 10 when performing a parallel movement operation in the mode 1, as shown in FIG. 4. The move key 822 is arranged at the center of boat display in a state where no touch operation is performed. Then, the user slides the move key 822 from a center position by a touch operation to input the movement direction and output (propulsion power) of the boat 1. When the sliding distance is increased, the output is increased. The move key 822 is released (the touch is released), whereby the outputs of the thrusters 7a and 7b are stopped. At this time, the move key 822 returns to the center position.

As shown in FIG. 5, the user touches the rotation key 823a (823b) by the operation object 10 while touching the activation key 821 (see FIG. 3) by another operation object 10 when performing a rotational movement operation in the mode 1. Then, the user slides the rotation key 823a (823b) in a rotation direction by a touch operation to input the rotation direction and output (propulsion power) of the boat 1. When the sliding distance is increased, the output is increased. The rotation key 823a (823b) is released (the touch is released), whereby the outputs of the thrusters 7a and 7b are stopped.

As shown in FIG. 6, in the mode 2 in which the boat is maneuvered by a gyro operation, the operation screen 82b is displayed on the touch panel 82. Specifically, activation keys 824a and 824b and slide keys 825a and 825b are displayed on the operation screen 82b. The CPU 81 enables the operation of the boat 1 performed through the operation screen 82b when detecting a plurality of operations including a touch panel operation on the display device 8 (touch panel 82) simultaneously. In other words, in this mode 2, operations of tilting and rotating the display device 8 are enabled in a state where both the activation keys 824a and 824b are touched. In a state where either the activation key 824a or 824b is touched, the slide key 825a or 825b is touched simultaneously, whereby the operation of the boat 1 is enabled. The activation keys 824a and 824b and the slide keys 825a and 825b are examples of the "software key" in the present invention. The activation keys 824a and 824b are examples of the "first key" in the present invention, and the slide keys 825a and 825b are examples of the "second key" in the present invention.

Specifically, the CPU 81 enables the movement operation of the boat 1 performed through the operation screen 82b when detecting operations on the activation keys 824a and 824b simultaneously. In this case, the CPU 81 detects the tilted posture of the display device 8 and accepts a boat maneuvering operation on the basis of a detection result of the gyro sensor 83. The CPU 81 enables the movement operation of the boat 1 performed through the operation screen 82b when detecting operations on the activation key 824a or 824b and the slide key 825a or 825b simultaneously.

More specifically, when performing a front-back movement operation and a turning operation in the mode 2, as shown in FIG. 7, the user tilts the display device 8 forward to input a forward movement operation and tilts the display device 8 backward to input a reverse movement operation while touching the activation keys 824a and 824b by the operation objects 10 (such as fingers or touch pens). At this time, the outputs are adjusted according to the tilt angle of the display device 8 from a reference position. When the tilt angle from the reference position is increased, the outputs are increased. Furthermore, the user rotates the display device 8 rightward to input a right turning operation and rotates the display device 8 leftward to input a left turning operation while touching the activation keys 824a and 824b by the operation objects 10. The user can also operate the display device 8 in a combination of forward-backward tilting and right-left rotation.

When performing a right-left movement operation in the mode 2, as shown in FIG. 8, the user touches the slide key 825a (825b) by the operation object 10 while touching the activation key 824b (824a) by the operation object 10. Then, the user slides the slide key 825a (825b) in a right-left movement direction (the long-side direction of the screen) by a touch operation to input the movement direction and output (propulsion power) of the boat 1. When the sliding distance is increased, the output is increased.

Figure 9:
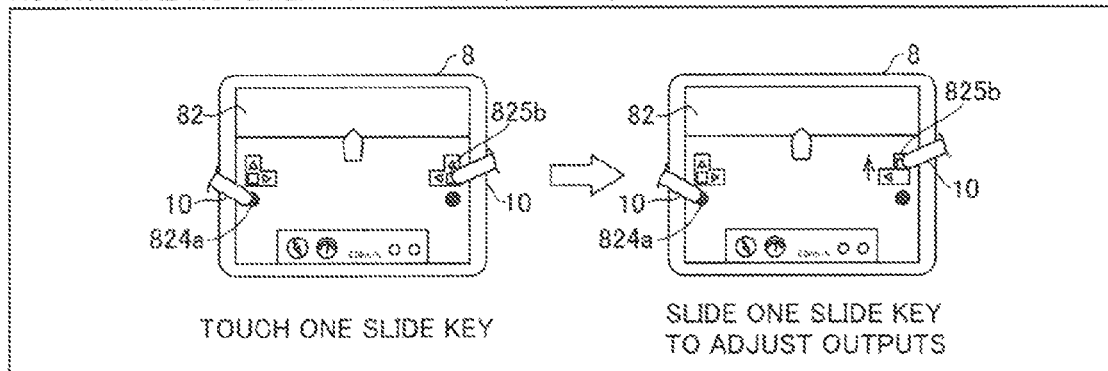
FIG. 9 is a diagram for illustrating a rotational movement operation of the gyro operation (mode 2) of the boat maneuvering system according to the embodiment of the present invention.

When operating a rotational movement operation in the mode 2, as shown in FIG. 9, the user touches the slide key 825a (825b) by the operation object 10 while touching the activation key 824b (824a) by the operation object 10. Then, the user slides the slide key 825a (825b) in a rotation direction (the short-side direction of the screen) by a touch operation to input the rotation direction and output (propulsion power) of the boat 1. When the sliding distance is increased, the output is increased.

Figure 10:
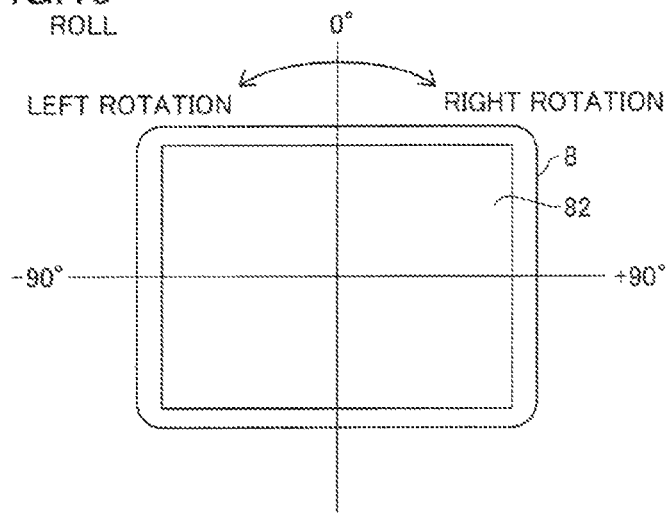
FIG. 10 is a diagram for illustrating the roll of a display device of the boat maneuvering system according to the embodiment of the present invention.
Figure 11:
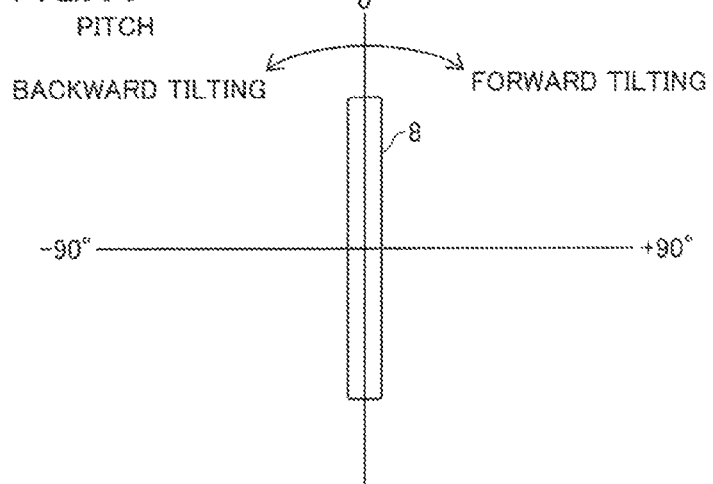
FIG. 11 is a diagram for illustrating the pitch of the display device of the boat maneuvering system according to the embodiment of the present invention.

As shown in FIGS. 10 and 11, the right-left rotation and the forward-backward tilting of the display device 8 are defined. Specifically, a state where the long side of the display device 8 is made horizontal is set to 0 degrees, a right rotation direction is set to a positive angle, and a left rotation direction is set to a negative angle, as shown in FIG. 10. As shown in FIG. 11, a state where the display device 8 is vertically upright is set to 0 degrees, a forward tilting direction (a direction in which the touch panel 82 faces upward) is set to a positive angle, and a backward tilting direction (a direction in which the touch panel 82 faces downward) is set to a negative angle.

When the user operates the display device 8 by tilting and rotation in the mode 2, the CPU 81 calibrates the reference position of the tilted posture of the display device 8 on the basis of a detection result of the gyro sensor 83. In other words, the CPU 81 sets the initial position by calibration. The CPU 81 acquires a change (tilt and rotation) amount from the initial position and detects an operation input. In some embodiments, a range of positions (e.g., −10 degrees to 10 degrees) of the display device 8 may correspond to the reference position so that minor variances in movement of the display device 8 will not affect movement of the boat 1.

According to this embodiment, the CPU 81 stops the operation of the thrusters 7a and 7b when not detecting a plurality of inputs during maneuvering of the boat 1 through the display device 8 so as to reduce the thrust of the boat 1 to almost zero. The CPU 81 stops the operation of the thrusters 7a and 7b to maintain the turning angles of the thrusters 7a and 7b. The CPU 81 restarts boat maneuvering from the stop state (the turning angles of the thrusters 7a and 7b) when the user provides a plurality of inputs again after the stop.

Boat maneuvering processing in the mode 1 performed by the CPU 81 of the display device 8 in the boat maneuvering system 100 according to this embodiment is now described with reference to a flowchart in FIG. 12.

Figure 12:
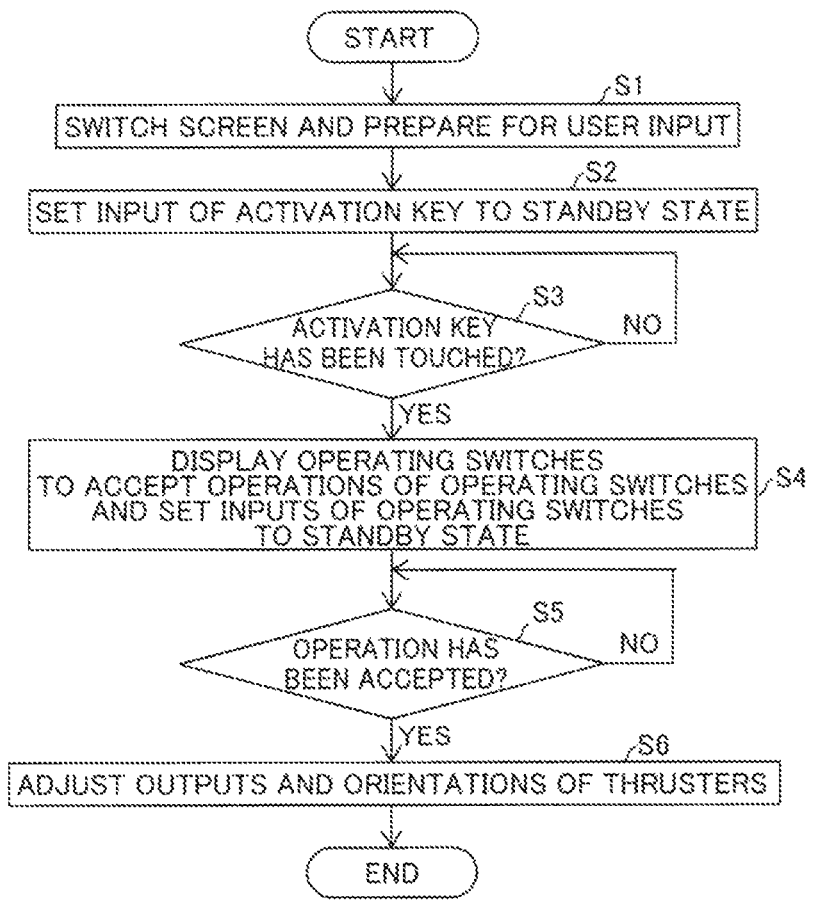
FIG. 12 is a flowchart for illustrating boat maneuvering processing in the mode 1 of the boat maneuvering system according to the embodiment of the present invention.

When the user selects the mode 1, the CPU 81 switches the screen to the operation screen 82a (see FIG. 3) and prepares for operation inputs for boat maneuvering provided by the user at a step S1 in FIG. 12. At a step S2, the operation input of the activation key 821 (see FIG. 3) is set to a standby state. At a step S3, the CPU 81 determines whether or not the activation key 821 has been touched. The CPU 81 repeats the determination at the step S3 until the activation key 821 has been touched.

When determining that the activation key 821 has been touched, the CPU 81 displays operating switches (the move key 822 and the rotation keys 823a and 823b) (see FIG. 3) to accept operations performed by the operating switches at a step S4. For example, the move key 822 and the rotation keys 823a and 823b are displayed (displayed from a blanked state) or emphatically displayed (changed in color or displayed darker) on the operation screen 82a by touching the activation key 821. Then, the operation inputs of the move key 822 and the rotation keys 823a and 823b are set to a standby state.

The CPU 81 determines whether or not an operating switch (the move key 822, the rotation key 823a, or the rotation key 823b) has been touched at a step S5. The CPU 81 repeats the determination at the step S5 until the operating switch (the move key 822, the rotation key 823a, or the rotation key 823b) has been touched. When determining that the operating switch (the move key 822, the rotation key 823a, or the rotation key 823b) has been touched, the CPU 81 adjusts the outputs and orientations of the thrusters 7a and 7b at a step S6, and the boat 1 is moved. Thereafter, in the mode 1, the CPU 81 repeats the processing at the steps S2 to S6. When the touch operation of the activation key 821 has been released in the middle of the operation, the CPU 81 returns to the step S2 immediately.

Boat maneuvering processing in the mode 2 performed by the CPU 81 of the display device 8 in the boat maneuvering system 100 according to this embodiment is now described with reference to a flowchart in FIG. 13.

Figure 13:
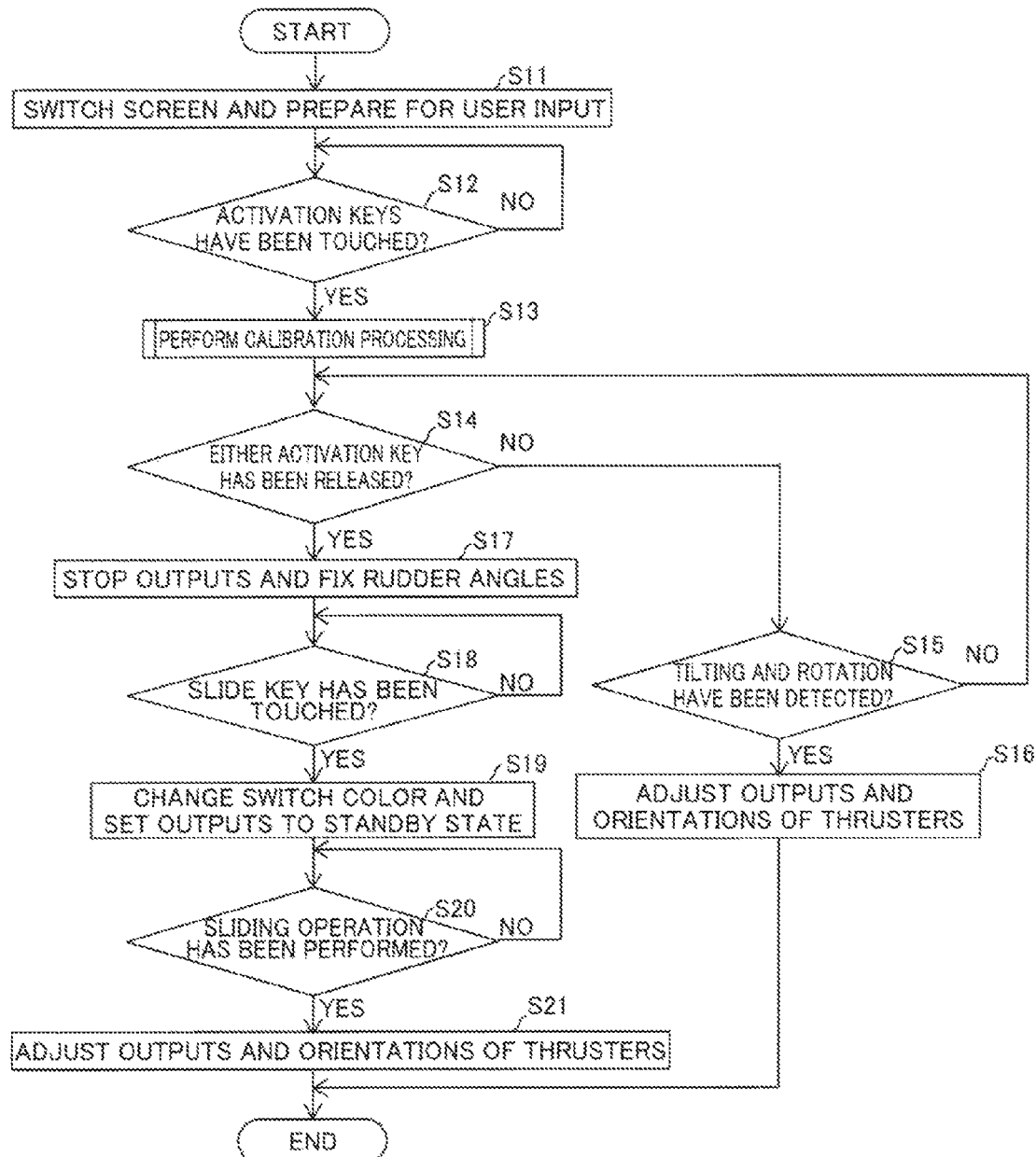
FIG. 13 is a flowchart for illustrating boat maneuvering processing in the mode 2 of the boat maneuvering system according to the embodiment of the present invention.

When the user selects the mode 2, the CPU 81 switches the screen to the operation screen 82b (see FIG. 6) and prepares for operation inputs for boat maneuvering provided by the user at a step S11 in FIG. 13. At a step S12, the CPU 81 determines whether or not both the activation keys 824a and 824b have been touched. The CPU 81 repeats the determination at the step S12 until both the activation keys 824a and 824b have been touched.

When determining that the activation keys 824a and 824b have been touched, the CPU 81 performs calibration processing at a step S13. At a step S14, the CPU 81 determines whether or not the touch operation of either the activation key 824a or 824b has been released. In other words, the CPU 81 determines whether or not only one of the activation keys 824a and 824b has been touched. When determining that the touch operation has not been released (the touch operations have continued), the CPU 81 advances to a step S15, and when determining that the touch operation has been released, the CPU 81 advances to a step S17.

The CPU 81 determines whether or not the tilting (forward-backward tilting) and rotation (right-left rotation) of the display device 8 have been detected at the step S15. When determining that the tilting (forward-backward tilting) and rotation (right-left rotation) of the display device 8 have not been detected, the CPU 81 returns to the step S14, and when determining that the tilting (forward-backward tilting) and rotation (right-left rotation) of the display device 8 have been detected, the CPU 81 advances to a step S16. At the step S16, the CPU 81 adjusts the outputs and orientations of the thrusters 7a and 7b on the basis of the tilting and rotation of the display device 8, and the boat 1 is moved.

When determining that the touch operation of either the activation key 824a or 824b has been released at the step S14, the CPU 81 stops the outputs of the thrusters 7a and 7b and fixes (maintains) the directions of the rudder angles (thrusters 7a and 7b) at a step S17. At a step S18, the CPU 81 determines whether or not the slide key 825a or 825b has been touched. The CPU 81 repeats the processing at the step S18 until the slide key 825a or 825b has been touched.

When determining that the slide key 825a or 825b has been touched, the CPU 81 changes the switch color of the slide key 825a or 825b that has been touched and sets the outputs of the thrusters 7a and 7b to a standby state at a step S19. At a step S20, the CPU 81 determines whether or not the slide key 825a or 825b has been slid. The CPU 81 repeats the processing at the step S20 until the slide key 825a or 825b has been slid.

When determining that the slide key 825a or 825b has been slid, the CPU 81 adjusts the outputs and orientations of the thrusters 7a and 7b on the basis of the operation of the slide key 825a or 825b at a step S21, and the boat 1 is moved. Thereafter, in the mode 2, the CPU 81 repeats the processing at the steps S12 to S21. When the touch operations of both the activation keys 824a and 824b have been released in the middle of the operation, the CPU 81 returns to the step S12 immediately.

Processing for setting the target rudder angles and the target output values of the thrusters 7a and 7b to be moved in parallel performed by the CPU 81 of the display device 8 in the boat maneuvering system 100 according to this embodiment is now described with reference to a flowchart in FIG. 14.

When accepting a parallel movement operation by the user, the CPU 81 determines whether or not $\theta$in is at least 90 degrees and less than 270 degrees at a step S31. $\theta$in indicates a direction in which the move key 822 is slid with respect to a bow direction, as shown in FIG. 4. As to $\theta$in, clockwise rotation is taken as positive, and counterclockwise rotation is taken as negative. When determining that $\theta$in is at least 90 degrees and less than 270 degrees, the CPU 81 advances to a step S32, and when determining that $\theta$in is at least 0 degrees and less than 90 degrees or at least 270 degrees and less than 360 degrees, the CPU 81 advances to a step S35.

At the step S32, the CPU 81 sets an output direction Fdt. In other words, the CPU 81 sets the generation direction of thrust. Here, Fdt=−1, and thrust in a reverse turn direction is set. At a step S33, the CPU 81 determines whether or not $\theta$in is less than 180 degrees. When determining that $\theta$in is less than 180 degrees, the CPU 81 advances to a step S34, and when determining that $\theta$in is at least 180 degrees, the CPU 81 advances to a step S37. At the step S34, the CPU 81 sets a right-left adjustment angle $\theta$rd. Here, $\theta$rd is set to 180 degrees.

When determining that $\theta$in is at least 0 degrees and less than 90 degrees or at least 270 degrees and less than 360 degrees at the step S31, the CPU 81 sets the output direction Fdt to 1 at the step S35. In other words, here, thrust in a normal turn direction is set. At a step S36, the CPU 81 determines whether or not $\theta$in is less than 90 degrees. When determining that $\theta$in is at least 90 degrees, the CPU 81 advances to the step S34, and when determining that $\theta$in is less than 90 degrees, the CPU 81 advances to the step S37. At the step S37, the CPU 81 sets the right-left adjustment angle $\theta$rd. Here, $\theta$rd is set to 0 degrees.

At a step S38, the CPU 81 sets target rudder angles $\theta$ta and $\theta$tb. $\theta$ta is the target rudder angle of the thruster 7a, and $\theta$tb is the target rudder angle of the thruster 7b. $\theta$ta is set to Kxyaa×$\theta$in+$\theta$rd. $\theta$tb is set to Kxyab×$\theta$in+$\theta$rd. Kxyaa and Kxyab are correction values and set by constants or maps.

At a step S39, the CPU 81 sets target output values Qta and Qtb. Qta is the target output value of the thruster 7a, and Qtb is the target output value of the thruster 7b. Qta is set to Fdt×Kxyoa×Lxy, and Qtb is set to Fdt×Kxyob×Lxy. Lxy represents the sliding distance of the move key 822.

Processing for setting the target rudder angles and the target output values of the thrusters 7a and 7b to be rotationally moved in the mode 1 performed by the CPU 81 of the display device 8 in the boat maneuvering system 100 according to this embodiment is now described with reference to a flowchart in FIG. 15.

When accepting a rotational movement operation by the user, the CPU 81 determines whether or not the right rotation key 823b (see FIG. 3) has been operated at a step S41 in FIG. 15. When determining that the right rotation key 823b has been operated, the CPU 81 advances to a step S42. When determining that the right rotation key 823b has not been operated, the CPU 81 advances to a step S43. At the step S42, the CPU 81 sets the target rudder angles $\theta$ta and $\theta$tb. Here, $\theta$ta is set to about 90 degrees, and $\theta$tb is set to about 270 degrees. $\theta$ta and $\theta$tb are preferably set properly according to the number of thrusters, the installation positions of the thrusters, the position of the center of gravity, the water resistance, and the maneuvering feeling of the boat, etc., for example.

At the step S43, the CPU 81 determines whether or not the left rotation key 823*a* (see FIG. 3) has been operated. When determining that the left rotation key 823*a* has been operated, the CPU 81 advances to a step S44. When determining that the left rotation key 823*a* has not been operated, the CPU 81 returns to the step S41. At the step S44, the CPU 81 sets the target rudder angles θta and θtb. Here, θta is set to about 270 degrees, and θtb is set to about 90 degrees. θta and θtb are preferably set properly according to the number of thrusters, the installation positions of the thrusters, the position of the center of gravity, the water resistance, and the maneuvering feeling of the boat, etc., for example.

At a step S45, the CPU 81 sets the output direction Fdt. Here, Fdt=1, and thrust in the normal turn direction is set. At a step S46, the CPU 81 sets the target output values Qta and Qtb. Qta is set to Fdt×Ksoa×(L−Ld), and Qtb is set to Fdt×Ksob×(L−Ld). L represents the sliding distance of the rotation key 823*a* or 823*b*, and Ld represents the distance of a dead zone (play). When L is not more than Ld, the output values Qta and Qtb are set to 0.

Calibration processing in the mode 2 performed by the CPU 81 of the display device 8 in the boat maneuvering system 100 according to this embodiment is now described with reference to a flowchart in FIG. 16.

When the user touches both the activation keys 824*a* and 824*b* (see FIG. 6), the CPU 81 provides calibration mode display on the touch panel 82 at a step S51. At a step S52, the CPU 81 determines whether or not the detection result of the gyro sensor 83 is within a prescribed value. For example, the CPU 81 determines whether or not the angle (see FIG. 11) of the display device 8 in a pitch direction is in the range of 45±10 degrees and whether or not the angle (see FIG. 10) of the display device 8 in a roll direction is in the range of 0±5 degrees.

When determining that the detection result is within the prescribed value, the CPU 81 advances to a step S53, and when determining that the detection result is not within the prescribed value, the CPU 81 repeats the determination at the step S52. At the step S53, the CPU 81 determines whether or not the holding angle of the display device 8 has been within a prescribed value for a prescribed period. In other words, the CPU 81 determines whether or not the display device 8 is stably held. The prescribed period is one second, for example. When determining that the holding angle of the display device 8 has not been within the prescribed value for the prescribed period, the CPU 81 returns to the step S52, and when determining that the holding angle of the display device 8 has been within the prescribed value for the prescribed period, the CPU 81 temporarily sets a zero point (initial position) at a step S54.

At a step S55, display during setting of the zero point (initial position) is provided on the touch panel 82. At a step S56, the CPU 81 determines whether or not the detection result of the gyro sensor 83 is within a prescribed value. For example, the CPU 81 determines whether or not the angle (see FIG. 11) of the display device 8 in the pitch direction is in the range of the temporarily set value ±3 degrees and whether or not the angle (see FIG. 10) of the display device 8 in the roll direction is in the range of the temporarily set value ±1 degrees.

When determining that the detection result is within the prescribed value, the CPU 81 advances to a step S57, and when determining that the detection result is not within the prescribed value, the CPU 81 returns to the step S51. At the step S57, the CPU 81 determines whether or not the holding angle of the display device 8 has been within the prescribed value for a prescribed period. In other words, the CPU 81 determines whether or not the display device 8 is stably held. The prescribed period is three second, for example. In other words, the prescribed period here is set to be longer than the prescribed period for temporary setting. When determining that the holding angle of the display device 8 has not been within the prescribed value for the prescribed period, the CPU 81 returns to the step S56, and when determining that the holding angle of the display device 8 has been within the prescribed value for the prescribed period, the CPU 81 sets a sensor value to the zero point (initial position) at a step S58.

At a step S59, display of confirmation of the zero point (initial position) is provided on the touch panel 82. Thereafter, the calibration processing is terminated.

According to the aforementioned embodiment, the following effects are obtained.

According to this embodiment, as hereinabove described, the boat maneuvering system 100 is provided with the CPU 81 that enables the operation of the boat 1 through the operation screens 82*a* and 82*b* when detecting a plurality of operations on the display device 8 simultaneously, whereby the CPU 81 accepts no operation when the user touches the display device 8 at one point but accepts operations through the display device 8 only when the user intends to perform a plurality of operations simultaneously. Thus, the boat maneuvering system 100 that operates the movement of the boat 1 through the operation screens 82*a* and 82*b* of the display device 8 can more accurately detect an operation intended by the user.

According to this embodiment, as hereinabove described, the CPU 81 enables the operation of the boat 1 through the operation screens 82*a* and 82*b* when detecting a plurality of operations including a touch panel operation on the display device 8 simultaneously. Thus, the CPU 81 can easily accept the operation of the user by accepting the plurality of operations including the touch panel operation simultaneously.

According to this embodiment, as hereinabove described, the display device 8 and the CPU 81 are unitized. Thus, the structure can be simplified by unitization, as compared with the case where the display device 8 and the CPU 81 are provided separately.

According to this embodiment, as hereinabove described, the boat maneuvering system 100 allows the user to manipulate the thrust of the thrusters 7*a* and 7*b* through the operation screens 82*a* and 82*b*. Thus, the user can easily manipulate the thrust of the thrusters 7*a* and 7*b* through the display device 8 while the display device 8 accurately detects the operation of the user.

According to this embodiment, as hereinabove described, turning of the thrusters 7*a* and 7*b* can be operated through the operation screens 82*a* and 82*b*. Thus, the user can easily operate turning of the thrusters 7*a* and 7*b* through the display device 8 while the display device 8 accurately detects the operation of the user.

According to this embodiment, as hereinabove described, the plurality of thrusters 7*a* and 7*b* are controlled on the basis of operations through the operation screens 82*a* and 82*b*. Thus, by combining the propulsion power of the plurality of thrusters 7*a* and 7*b*, the boat 1 can be easily moved in an arbitrary direction and can be easily rotationally moved.

According to this embodiment, as hereinabove described, the plurality of thrusters 7*a* and 7*b* can be operated individually on the basis of operations through the operation screens 82*a* and 82*b*. Thus, the user can operate the plurality of thrusters 7*a* and 7*b* individually and more easily maneuver the boat by performing an operation on the display device 8.

According to this embodiment, as hereinabove described, the boat maneuvering system 100 is configured to stop the operation of the thrusters 7*a* and 7*b* when not detecting a plurality of inputs during the operation of the boat 1 through the display device 8. Thus, the boat maneuvering system 100 can stop the operation of the thrusters 7*a* and 7*b* not to allow boat maneuvering when the boat maneuvering system 100 does not detect a plurality of inputs and cannot confirm the intent of the operation of the user.

According to this embodiment, as hereinabove described, the boat maneuvering system 100 stops the operation of the thrusters 7*a* and 7*b* to reduce the thrust of the boat 1 to almost zero. Thus, the boat maneuvering system 100 can promptly stop the movement of the boat 1 when the boat maneuvering system 100 does not detect a plurality of inputs and cannot confirm the intent of the operation of the user.

According to this embodiment, as hereinabove described, the boat maneuvering system 100 stops the operation of the thrusters 7*a* and 7*b* to maintain the turning angles of the thrusters 7*a* and 7*b*. Thus, the boat maneuvering system 100 can restart boat maneuvering from the stop state when the user provides a plurality of inputs again.

According to this embodiment, as hereinabove described, the software keys (the activation keys 821, 824*a*, and 824*b*, the move key 822, the rotation keys 823*a* and 823*b*, and the slide keys 825*a* and 825*b*) configured to maneuver the boat 1 are displayed on the operation screens 82*a* and 82*b*. Thus, the user can easily maneuver the boat by the software keys.

According to this embodiment, as hereinabove described, the display device 8 is configured to detect the tilted posture of the display device 8 and accept an operation for maneuvering the boat on the basis of the detection result of the gyro sensor 83. Thus, the user can easily maneuver the boat by tilting and operating the display device 8.

According to this embodiment, as hereinabove described, the boat maneuvering system 100 calibrates the reference position of the tilted posture of the display device 8 on the basis of the detection result of the gyro sensor 83 when the user maneuvers the boat 1 through the display device 8. Thus, the boat maneuvering system 100 can accurately detect the operation of tilting the display device 8 by calibration.

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the outboard motor mounted on the rear portion of the boat body and the two turnable thrusters mounted on the front and rear portions of the boat body are provided as the power source according to the present invention in the aforementioned embodiment, the present invention is not restricted to this. According to the present invention, the power source may alternatively be one thruster or three or more thrusters. Furthermore, the thrusters may alternatively include an unturnable fixed thruster. The power source may alternatively be a plurality of outboard motors. In this case, the outboard motors may be electrically driven or engine-driven. In the case where one engine outboard motor mounted on the rear portion of the boat body and the two turnable thrusters mounted on the front and rear portions of the boat body are provided as the power source according to the present invention, an outboard motor 3, a steering wheel 4, a remote controller 5, and a joystick 6 can share communication, and the outboard motor 3 may be stopped during use of the touch-screen display device, for example. Furthermore, when the steering wheel 4, the remote controller 5, and the joystick 6 are operated, thruster outputs through the touch-screen display device may be stopped.

While the thrusters as the power source are normally and reversely rotatable in the aforementioned embodiment, the present invention is not restricted to this. According to the present invention, the thrusters may alternatively have directivity and be only normally rotatable. In this case, a direction in which the thrust acts may be adjusted by adjusting the rudder angles of the thrusters to be at least 360 degrees.

While the tablet terminal is employed as the display device according to the present invention in the aforementioned embodiment, the present invention is not restricted to this. According to the present invention, the display device may alternatively be a portable information terminal such as a smartphone or a display device such as a television device.

While the display device and the CPU (second controller) are unitized in the aforementioned embodiment, the present invention is not restricted to this. According to the present invention, the second controller may not be unitized with the display device. In this case, the second controller may be a boat ECU or the like.

While the user holds the display device in his/her hand to operate the same in the aforementioned embodiment, the present invention is not restricted to this. According to the present invention, the user may alternatively use the display device in a state where the display device is placed or use the display device in a state where the display device is tiltably and rotatably supported.

While the tilt of the display device is detected on the basis of the detection result of the gyro sensor (angular velocity sensor) of the display device in the aforementioned embodiment, the present invention is not restricted to this. According to the present invention, the tilt of the display device may alternatively be detected on the basis of a detection result of an acceleration sensor, or the tilt of the display device may alternatively be detected on the basis of the detection results of both the angular velocity sensor and the acceleration sensor.

While the operation of the boat is enabled when operations of two of a plurality of software keys displayed on the touch panel of the display device are detected simultaneously in the aforementioned embodiment, the present invention is not restricted to this. According to the present invention, the operation of the boat may alternatively be enabled when operations of two or more of the software keys of the touch panel of the display device and a mechanical button(s) are detected simultaneously. Alternatively, when three or more operations on the display device are detected simultaneously, the operation of the boat may be enabled.

While the processing operations performed by the CPU (second controller) of the display device are described, using the flowcharts described in a flow-driven manner in which processing is performed in order along a processing flow for the convenience of illustration in the aforementioned embodiment, the present invention is not restricted to this. According to the present invention, the processing operations performed by the second controller may alternatively be performed in an event-driven manner in which processing is performed on an event basis. In this case, the processing operations performed by the second controller may be performed in a complete event-driven manner or in a combination of an event-driven manner and a flow-driven manner.

What is claimed is:

1. A boat maneuvering system comprising:
a power source;
a first controller that controls the power source;
a display device that has a touch panel function and displays an operation screen configured to operate movement of a boat; and
a second controller that is communicatively connected to the first controller and enables an operation of the boat through the operation screen when simultaneously detecting a plurality of operations of the display device.

2. The boat maneuvering system according to claim 1, wherein the plurality of operations, that are simultaneously detected, includes a touch panel operation.

3. The boat maneuvering system according to claim 1, wherein the display device and the second controller are unitized.

4. The boat maneuvering system according to claim 1, wherein the operation of the boat is a thrust of the power source, and the thrust can be manipulated through the operation screen.

5. The boat maneuvering system according to claim 1, wherein the operation of the boat is a turning of the power source, and the turning can be controlled through the operation screen.

6. The boat maneuvering system according to claim 1, wherein
the power source includes a plurality of power sources,
the plurality of power sources are all simultaneously controlled on the basis of an operation through the operation screen which is one of the plurality of operations of the display device; and
the simultaneously controlling the plurality of power sources is the operation of the boat.

7. The boat maneuvering system according to claim 1, wherein
the power source includes a plurality of power sources,
the plurality of power sources can be operated individually on the basis of an operation through the operation screen which is one of the plurality of operations of the display device, and
the individually controlling the plurality of power sources is the operation of the boat.

8. The boat maneuvering system according to claim 1, wherein the operation of the boat is an operation of the power source, and the operation of the power source is stopped when each of a plurality of inputs are not detected during the operation of the boat through the display device, and
the plurality of inputs corresponding to the plurality of operations of the display device.

9. The boat maneuvering system according to claim 8, wherein the operation of the power source is stopped, as the plurality of inputs are not detected, so that the operation of the power source is stopped to reduce thrust of the boat to almost zero.

10. The boat maneuvering system according to claim 8, wherein the operation of the power source is stopped, as the plurality of inputs are not detected, so that the operation of the power source is stopped to maintain a turning angle of the power source.

11. The boat maneuvering system according to claim 1, wherein a software key configured to maneuver the boat is displayed on the operation screen.

12. The boat maneuvering system according to claim 11, wherein
the software key displayed on the operation screen includes first and second keys,
the first key being configured to enable an operation by the second key, and
the second key being configured to instruct the boat to move, and
the second controller is configured to enable a movement operation of the boat through the operation screen when simultaneously detecting operations on the first key and the second key which are the plurality of operations of the display device, and
the movement operation being the operation of the boat.

13. The boat maneuvering system according to claim 1, wherein
the display device includes at least one of an angular velocity sensor and an acceleration sensor, and
the second controller is configured to detect a tilted posture of the display device,
the second controller accepting an operation for maneuvering the boat on the basis of a detection result of at least one of the at least one angular velocity sensor and acceleration sensor,
the operation for maneuvering the boat being said operation of the boat and
the detection result being one of the plurality of operations of the display device.

14. The boat maneuvering system according to claim 13, wherein a reference position of the tilted posture of the display device is calibrated on the basis of the detection result of at least one of the at least one angular velocity sensor and acceleration sensor when a user maneuvers the boat through the display device.

15. The boat maneuvering system according to claim 14, wherein a tilt of the display device relative to the reference position is detected by the second controller, and the detected tilt controls the maneuvering of the boat, the detected tilt being one of the plurality of operations of the display device.

16. The boat maneuvering system according to claim 1, wherein the second controller only allows operation of the boat through the display device when the second controller detects an input at an activation key of the display device, the input of the activation key being one of the plurality of operations of the display device.

17. The boat maneuvering system according to claim 16, wherein
the display device displays move and rotation keys,
the second controller maneuvering the boat in response to simultaneously detecting the input at the activation key, and at least one input at the move and rotation keys,
the maneuvering the boat being the operation of the boat, and
the at least one input at the move and rotation keys being at least one of the plurality of operations of the display device.

18. The boat maneuvering system according to claim 1, wherein the display device includes at least one of an angular velocity sensor and an acceleration sensor,
the second controller is configured to detect a tilted posture of the display device relative to a reference position of the display device on the basis of a detection result of the at least one of angular velocity sensor and acceleration sensor, and accept an operation for maneuvering the boat when the display device is tilted relative to the reference position, the maneuvering the boat being the operation of the boat, and the detected tilted posture being one of the plurality of operations of the display device.

19. A boat maneuvering device for a boat, comprising:
a display device that has a touch panel displaying an operation screen on the touch panel to operate movement of the boat; and
a second controller that is communicatively connected to a first controller, which controls a power source, to enable an operation of the boat through the operation screen when simultaneously detecting each of a plurality of operations of the operation screen.

20. A power source for maneuvering a boat, comprising:
a transmitting and receiving portion that communicates with a display device having a touch panel that displays an operation screen configured to operate movement of the boat;
a motor generating thrust;
a steering motor that adjusts a direction of the thrust; and
a controller that communicates with the display device via the transmitting and receiving portion, the controller being responsive to each of a plurality of inputs being received at the display device by controlling at least one of the motor to adjust a magnitude of the thrust, and the steering motor to adjust the direction of the thrust.

* * * * *